United States Patent
Yada et al.

(10) Patent No.: US 12,005,785 B2
(45) Date of Patent: Jun. 11, 2024

(54) VEHICLE POWER DEVICE AND WHEEL BEARING DEVICE EQUIPPED WITH GENERATOR

(71) Applicant: NTN CORPORATION, Osaka (JP)

(72) Inventors: Yuuji Yada, Iwata (JP); Kentaro Nishikawa, Iwata (JP)

(73) Assignee: NTN CORPORATION, Osaka (JP)

( * ) Notice: Subject to any disclaimer, the term of this patent is extended or adjusted under 35 U.S.C. 154(b) by 505 days.

(21) Appl. No.: 17/394,899

(22) Filed: Aug. 5, 2021

(65) Prior Publication Data

US 2021/0362585 A1 Nov. 25, 2021

Related U.S. Application Data

(63) Continuation of application No. PCT/JP2020/003941, filed on Feb. 3, 2020.

(30) Foreign Application Priority Data

Feb. 8, 2019 (JP) .................. 2019-021222

(51) Int. Cl.
*B60K 7/00* (2006.01)
*B60B 27/00* (2006.01)
(Continued)

(52) U.S. Cl.
CPC ........ *B60K 7/0007* (2013.01); *B60B 27/0052* (2013.01); *B60B 27/0063* (2013.01);
(Continued)

(58) Field of Classification Search
CPC .......... B60K 7/0007; B60K 2007/0092; B60B 27/0052; B60B 27/0063
See application file for complete search history.

(56) References Cited

U.S. PATENT DOCUMENTS 5,087,229 A * 2/1992 Hewko ................ B60K 7/0007
475/149
5,633,544 A * 5/1997 Toida .................... H02K 29/08
310/67 R
(Continued)

FOREIGN PATENT DOCUMENTS

JP 2008-044499 A 2/2008
JP 2011-185286 A 9/2011
(Continued)

OTHER PUBLICATIONS

Indian Office Action dated Dec. 26, 2022 in Indian Patent Application No. 202117039967 (6 pages).
(Continued)

*Primary Examiner* — Jeffrey J Restifo

(57) ABSTRACT

The vehicle power device includes: a wheel bearing; and an electric motor including a stator and a rotor. The vehicle power device includes a rotor casing that is a cover member covering the electric motor and a part of the wheel bearing, the part being located on an inboard side with respect to the hub flange, such that a separated space is defined inside the cover member. A seal member configured to prevent entry of moisture from a press-fitting part where a hub bolt is press-fitted into a bolt hole provided in the hub flange is disposed near the press-fitting part. The hub flange is formed with an annular groove coaxial with the hub bolt in an area where a head of the hub bolt comes into contact with an inboard-side surface of the hub flange, and the seal member having a ring shape is disposed in the annular groove.

10 Claims, 11 Drawing Sheets

(51) Int. Cl.
   *F16J 15/10*     (2006.01)
   *B60K 6/26*      (2007.10)
   *H02K 5/00*      (2006.01)

(52) U.S. Cl.
   CPC ........... *F16J 15/10* (2013.01); *B60B 27/0015* (2013.01); *B60K 6/26* (2013.01); *B60Y 2200/91* (2013.01); *B60Y 2200/92* (2013.01); *B60Y 2400/60* (2013.01); *F16C 2326/02* (2013.01); *H02K 5/00* (2013.01)

(56) References Cited

U.S. PATENT DOCUMENTS

| | | | | |
|---|---|---|---|---|
| 5,691,584 | A * | 11/1997 | Toida | H02K 7/116 |
| | | | | 310/67 R |
| 7,708,353 | B2 | 5/2010 | Inoue et al. | |
| 9,011,015 | B2 | 4/2015 | Ishikawa et al. | |
| 9,841,090 | B2 | 12/2017 | Funada | |
| 10,752,104 | B2 | 8/2020 | Kawamura et al. | |
| 2004/0112657 | A1* | 6/2004 | Ajiro | B60K 7/0007 |
| | | | | 180/65.51 |
| 2008/0174170 | A1 | 7/2008 | Inoue et al. | |
| 2012/0177315 | A1* | 7/2012 | Matsuki | F16J 15/3252 |
| | | | | 384/480 |
| 2012/0248850 | A1* | 10/2012 | Hirano | F16D 65/12 |
| | | | | 301/6.5 |
| 2012/0319458 | A1* | 12/2012 | Ozaki | H02K 5/203 |
| | | | | 301/6.5 |
| 2012/0326573 | A1* | 12/2012 | Yamamoto | H02K 7/116 |
| | | | | 310/67 R |
| 2013/0009450 | A1* | 1/2013 | Suzuki | H02K 7/116 |
| | | | | 301/6.5 |
| 2013/0049439 | A1* | 2/2013 | Yamada | B60B 27/0057 |
| | | | | 301/6.5 |
| 2013/0057048 | A1* | 3/2013 | Ishikawa | B60L 7/24 |
| | | | | 301/6.5 |
| 2013/0342058 | A1* | 12/2013 | Suzuki | B60K 17/046 |
| | | | | 310/83 |
| 2013/0342059 | A1* | 12/2013 | Suzuki | B60K 7/0007 |
| | | | | 310/83 |
| 2014/0233876 | A1 | 8/2014 | Ishikawa et al. | |
| 2014/0353056 | A1* | 12/2014 | Hirano | F16D 3/10 |
| | | | | 180/65.51 |
| 2015/0005130 | A1* | 1/2015 | Yamamoto | F16F 15/08 |
| | | | | 475/149 |
| 2015/0231959 | A1* | 8/2015 | Ishikawa | B60K 17/145 |
| | | | | 301/6.5 |
| 2016/0068054 | A1* | 3/2016 | Abe | F16D 3/185 |
| | | | | 180/65.51 |
| 2016/0076631 | A1 | 3/2016 | Funada | |
| 2018/0272865 | A1* | 9/2018 | Fukudome | B60K 17/043 |
| 2019/0248225 | A1 | 8/2019 | Kawamura et al. | |
| 2020/0112229 | A1* | 4/2020 | Yabuta | F16C 41/002 |
| 2020/0198456 | A1* | 6/2020 | Kawamura | B60K 7/00 |
| 2020/0238817 | A1* | 7/2020 | Yabuta | H02K 21/22 |
| 2020/0384804 | A1* | 12/2020 | Takeuchi | B60B 35/14 |
| 2021/0104942 | A1* | 4/2021 | Katsuta | H02K 1/2791 |
| 2021/0362585 | A1* | 11/2021 | Yada | F16C 33/76 |
| 2022/0314783 | A1* | 10/2022 | Yada | F16C 19/186 |

FOREIGN PATENT DOCUMENTS

| | | |
|---|---|---|
| JP | 2014-047899 A | 3/2014 |
| JP | 2014-151696 A | 8/2014 |
| JP | 2014-231868 A | 12/2014 |
| JP | 2018-052482 A | 4/2018 |
| JP | 2018-203193 A | 12/2018 |
| JP | 2019-018839 A | 2/2019 |
| WO | WO2012/176772 A | 12/2012 |
| WO | 2018/225695 A1 | 12/2018 |

OTHER PUBLICATIONS

Extended and Supplementary European Search Report dated Oct. 12, 2022 in International Patent Application No. 20753177.3 (7 pages).
International Search Report dated Apr. 7, 2020, in corresponding International Patent Application No. PCT/JP2020/003941.
Japanese Office Action dated Jul. 26, 2022 in Japanese Patent Application No. 2019-021222 (4 pages; 4 pages English translation).
International Preliminary Report on Patentability and Written Opinion for International Patent Application No. PCT/JP2020/003941 dated Aug. 19, 2021.

* cited by examiner

VEHICLE POWER DEVICE AND WHEEL BEARING DEVICE EQUIPPED WITH GENERATOR

CROSS REFERENCE TO THE RELATED APPLICATION

This application is a continuation application, under 35 U.S.C. § 111(a), of international application No. PCT/JP2020/003941, filed Feb. 3, 2020, which is based on and claims Convention priority to Japanese patent application No. 2019-021222, filed Feb. 8, 2019, the entire disclosures of all of which are herein incorporated by reference as a part of this application.

BACKGROUND OF THE INVENTION

Field of the Invention

The present invention relates to a vehicle power device and a wheel bearing device equipped with a generator (hereinafter, referred to as "generator equipped wheel bearing device"), the vehicle power device and wheel bearing device being adapted to be mounted in a vehicle, and to a technology for preventing entry of water or the like into internal spaces of the devices.

Description of Related Art

As shown in FIG. 13, a conventional wheel bearing includes, for example, an inner ring 60 as a rotary ring, an outer ring 61 as a fixed ring, and rolling elements 62 interposed between the inner ring 60 and the outer ring 61, the inner ring 60 having a hub axle into which hub bolts 63 are press-fitted. A brake disk and a wheel body are fixed by the hub bolts 63 and nuts, and the brake disk and the wheel body rotate about an axle shaft. The non-rotary outer ring 61 is fixed by bolts to an automotive fixing component such as a knuckle.

In recent years, in association with electrification of automobiles, a vehicle power device having a motor incorporated inside a wheel has been proposed (for example, Patent Document 1). Such a vehicle power device integrally includes a wheel bearing for supporting a wheel and an electric motor for driving and regeneratively braking the wheel and has many advantages such as drive assistance of a vehicle, power regeneration during speed reduction, and attitude stabilization by torque control in each wheel.

FIG. 14 is a sectional view of a vehicle power device with a conventional wheel bearing. An intermediate member 58 is fixed to an automobile fixing part 64 such as a knuckle. A stator core 65 and an outer ring 61 are fixed to the intermediate member 58. A coil wire 66 is wound around the stator core 65 for generating a magnetic force. On the other hand, a rotor 68 is attached to a hub axle 60a of the wheel bearing through a rotor casing 67, and the rotor 68 rotates around the stator core 65. There is an air gap between the stator core 65 and the rotor 68 typically in a range of about 0.3 mm to 1.0 mm. An electric motor integrated with the wheel bearing enables drive assistance during automobile driving and energy recovery by power generation during braking.

RELATED DOCUMENT

Patent Document

[Patent Document 1] JP Laid-open Patent Publication No. 2018-52482

SUMMARY OF THE INVENTION

In a case where moisture enters an internal space 69 of the vehicle power device during driving in the rain, the coil wire 66 may be electrically short-circuited, or metal components such as the stator core 65 may rust and thus cause abnormality. Therefore, as with a typical casing for an electric motor, seal components 70, 71, 72 are inserted between the internal space 69 of the device and the outside to prevent entry of moisture.

In the vehicle power device including such a conventional wheel bearing (FIG. 13), however, moisture still enters the internal space 69 of the device from press-fitting parts where hub bolts 63 are press-fitted in the wheel bearing, even if the seal components 70, 71, 72 are provided for sealing, and thus causes short-circuiting of the coil wire 66 or rusting of the metal components. Conventional vehicles without a vehicle power device including electric components did not have such a problem, whereas vehicles including such a vehicle power device have this new problem.

An object of the present invention is to provide a vehicle power device and a generator-equipped wheel bearing device capable of separating internal spaces of the devices and preventing entry of moisture into the internal spaces, so that internal components can be kept normal.

A vehicle power device according to the present invention includes:

a wheel bearing including a fixed ring and a rotary ring rotatably supported by the fixed ring through rolling elements, the rotary ring including a hub flange configured to be attached with a wheel of a vehicle; and an electric motor including a stator attached to the fixed ring and a rotor attached to the rotary ring, and the vehicle power device further includes:

a cover member covering the electric motor and a part of the wheel bearing, the part being located on an inboard side with respect to the hub flange, such that a separated space is defined inside the cover member; and a seal member configured to prevent entry of moisture from a press-fitting part where a hub bolt is press-fitted into a bolt hole provided in the hub flange, the seal member being disposed at the press-fitting part or near the press-fitting part.

The area "near the press-fitting part" may refer to, for example, an area that is located on the inboard side with respect to the press-fitting part and has a gap between the hub flange and the hub bolt or a part covering a part of the hub bolt.

According to this constitution, where the vehicle power device including the electric motor is mounted in a vehicle including a main drive source such as an internal combustion engine, the electric motor enables drive assistance during driving and energy recovery by power generation during braking. Further, the cover member covers the electric motor and a part of the wheel bearing, the part being located on the inboard side with respect to the hub flange, such that a separated space is defined inside the cover member. Furthermore, the seal member configured to prevent entry of moisture from the press-fitting part of the hub bolt in the hub flange is provided, so that it is possible to prevent entry of moisture into the separated space from the press-fitting part of the hub bolt even in the rain etc. This makes it possible to prevent the coil wire of the stator from being electrically short-circuited and to prevent the stator core of the stator from rusting. Thus, the electric motor can be kept normal.

The wheel bearing may have an outer ring serving as the fixed ring and an inner ring serving as the rotary ring, the cover member may be fixed to the hub flange of the inner ring, the cover member may have a casing cylindrical part having a cylindrical shape and covering the electric motor and the part located on the inboard side with respect to the hub flange, and the stator may be disposed on an outer periphery of the outer ring. In such a case, the casing cylindrical part extending from the hub flange toward the inboard side in a cylindrical manner can cover the electric motor and most of the wheel bearing, so that a separated space can be defined inside the casing cylindrical part.

The cover member may include: a casing bottom part having a flat annular plate shape and fixed to a side surface of the hub flange; and the casing cylindrical part extending from an outer peripheral edge portion of the casing bottom part toward the inboard side, and further, the vehicle power device may be provided with an inboard-side sealing member configured to seal a gap between an inboard-side end of the casing cylindrical part and a chassis frame component of the vehicle and with an outboard-side sealing member configured to seal a gap between the casing bottom part and the side surface of the hub flange.

In such a case, the inboard-side sealing member makes it possible to easily prevent entry of moisture and foreign objects from the gap between the inboard-side end of the casing cylindrical part and the chassis frame component. Also, the outboard-side sealing member makes it possible to easily prevent entry of moisture and the like from the gap between the casing bottom part and the side surface of the hub flange.

A brake rotor may be attached to the hub flange along with the wheel, the electric motor may have a smaller diameter than that of an outer peripheral part of the brake rotor against which a brake caliper is pressed, and the electric motor may be located within an axial range between the hub flange and an outboard-side surface of the chassis frame component of the vehicle. In such a case, it is possible to secure a space for disposing the electric motor inside the brake rotor, so that the electric motor can be compactly accommodated.

The seal member may be incorporated between a head of the hub bolt and the inboard-side end of the hub flange. In such a case, it is possible to use a common hub bolt to prevent entry of moisture into the separated space from the press-fitting part of the hub bolt.

The bolt hole may have an inboard-side part provided with a tapered part having an increasing diameter toward the inboard side, and the seal member may be incorporated between the head of the hub bolt and the tapered part. In such a case, it is possible to use a common hub bolt to prevent entry of moisture into the separated space from the press-fitting part of the hub bolt and to eliminate an operation of newly processing a groove for sealing in the hub flange, so that the number of manufacturing steps can be reduced.

A seal cap having a bottomed cylindrical shape and covering a surface of the head of the hub bolt may be attached to the head of the hub bolt, and the seal member may be incorporated to an opening edge portion of the seal cap. In such a case, it is possible to prevent entry of moisture into the separated space from the press-fitting part of the hub bolt, without any special processing to the hub flange.

The seal member may be shaped as a ring made of a rubber material, a resin material, or a metal material. In such a case, it is possible to use a commercially available product, such as an O-ring, as a ring-shaped seal member made of a rubber material.

The seal member may be a liquid gasket. In such a case, the liquid gasket may be applied to the press-fitting part or near the press-fitting part and be allowed to solidify, so that sealing performance can be enhanced. Where the liquid gasket is applied to e.g. the press-fitting part, it is possible to simplify the work as compared to a case where an O-ring or the like is incorporated to e.g. the press-fitting part.

A generator-equipped wheel bearing device according to the present invention includes:

a wheel bearing including a fixed ring and a rotary ring rotatably supported by the fixed ring through rolling elements, the rotary ring including a hub flange configured to be attached with a wheel of a vehicle; and a generator including a stator attached to the fixed ring and a rotor attached to the rotary ring, and the generator-equipped wheel bearing device further includes:

a cover member covering the generator and a part of the wheel bearing, the part being located on an inboard side with respect to the hub flange, such that a separated space is defined inside the cover member; and a seal member configured to prevent entry of moisture from a press-fitting part where a hub bolt is press-fitted into a bolt hole provided in the hub flange, the seal member being disposed at the press-fitting part or near the press-fitting part.

According to this constitution, where the generator-equipped wheel bearing device is mounted in a vehicle including a main drive source such as an internal combustion engine, the generator enables energy recovery and the like by power generation during braking. Further, the cover member covers the generator and a part of the wheel bearing, the part being is located on the inboard side with respect to the hub flange, such that a separated space is defined inside the cover member. Furthermore, the generator-equipped wheel bearing device is provided with the seal member configured to prevent entry of moisture from the press-fitting part of the hub bolt in the hub flange, so that it is possible to prevent entry of moisture into the separated space from the press-fitting part of the hub bolt even in the rain etc. This makes it possible to prevent the coil wire of the stator from being electrically short-circuited and to prevent the stator core of the stator from rusting. Thus, the generator can be kept normal.

The present invention encompasses any combination of at least two features disclosed in the claims and/or the specification and/or the drawings. In particular, any combination of two or more of the appended claims should be equally construed as included within the scope of the present invention.

BRIEF DESCRIPTION OF THE DRAWINGS

The present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views. In the figures.

DESCRIPTION OF THE EMBODIMENTS

Vehicle Power Device of Present Embodiment

Figure 1:
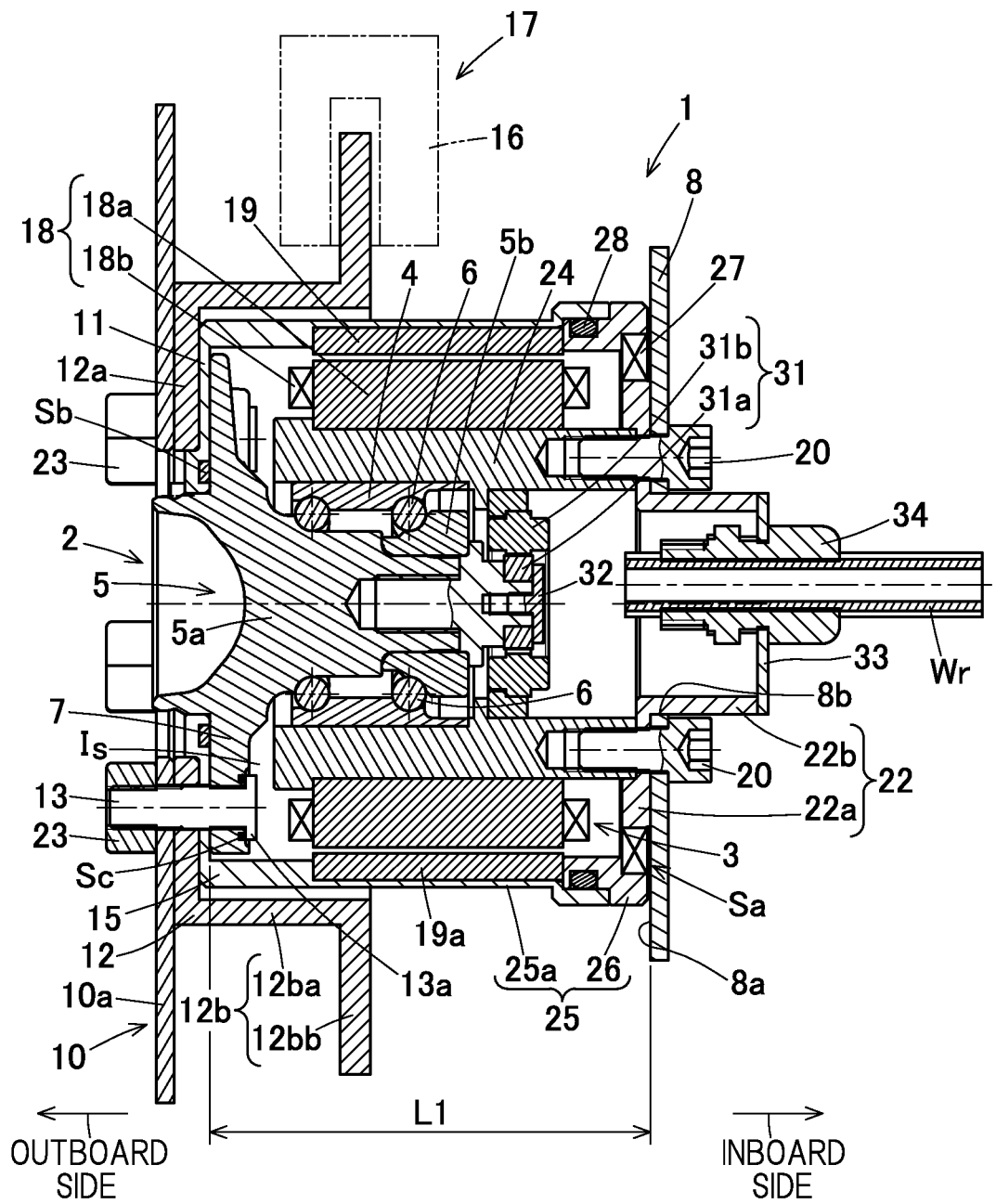
FIG. 1 is a sectional view of a vehicle power device according to an embodiment of the present invention.

A vehicle power device according to an embodiment of the present invention will be described with reference to FIG. 1 to FIG. 3. As shown in FIG. 1, the vehicle power device 1 includes a wheel bearing 2 and an electric motor 3.

Wheel Bearing 2

The wheel bearing 2 includes: an outer ring 4 serving as a fixed ring; double rows of rolling elements 6; and an inner ring 5 serving as a rotary ring. The inner ring 5 is rotatably supported by the outer ring 4 through the double rows of rolling elements 6. Grease is filled into a bearing space between the outer ring 4 and the inner ring 5. The inner ring 5 includes a hub axle 5a and a partial inner ring 5b fitted to an outer peripheral surface of the hub axle 5a on an inboard side. The hub axle 5a includes a hub flange 7 in a part of the hub axle, which protrudes toward an outboard side with respect to the outer ring 4 in an axial direction.

On an outboard-side surface of the hub flange 7, a wheel body 10a of a wheel 10, a brake rotor 12, and a casing bottom part 11 (which will be described later) are attached by hub bolts 13 in an overlapping manner in the axial direction. A non-illustrated tire is attached to an outer periphery of the wheel body 10a. In the present specification, an "outboard side" refers to a side closer to an outside of a vehicle in a widthwise direction of the vehicle in a state where the vehicle power device 1 is mounted in the vehicle, and an "inboard side" refers to a side closer to a center of the vehicle in the widthwise direction of the vehicle in the state mentioned above.

Brake

Figure 2:
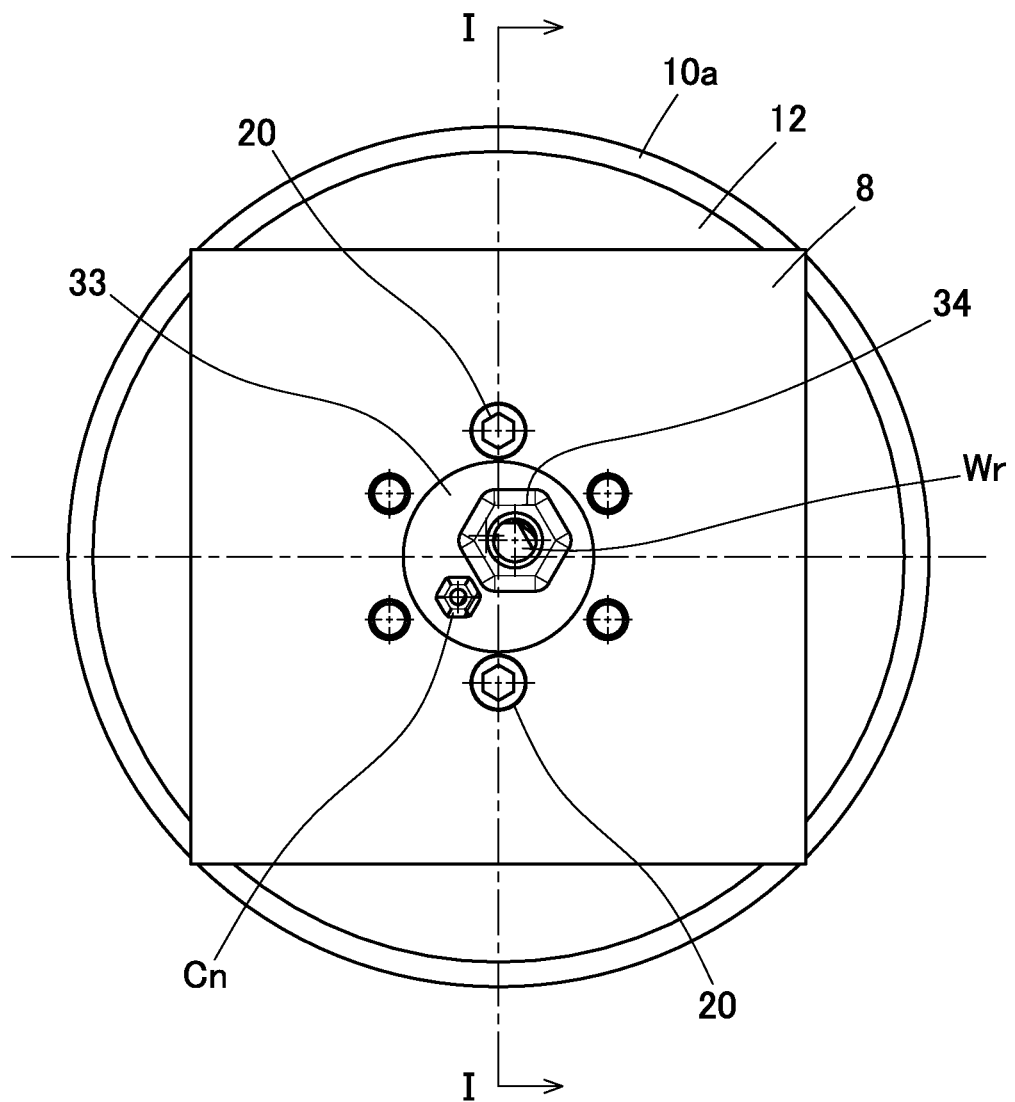
FIG. 2 is a side view of the vehicle power device.

FIG. 1 is a sectional view along line I-I of FIG. 2. As shown in FIG. 1 and FIG. 2, a brake 17 is a disk-type friction brake including the brake rotor 12 and a brake caliper 16. The brake rotor 12 includes a flat plate part 12a and an outer peripheral part 12b. The flat plate part 12a is an annular, flat plate-like member which overlaps with the hub flange 7, with the casing bottom part 11 interposed therebetween. The outer peripheral part 12b includes a cylindrical portion 12ba extending from an outer peripheral edge portion of the flat plate part 12a toward an inboard side in a cylindrical manner and a flat plate portion 12bb extending from an inboard-side end of the cylindrical portion 12ba toward an outer diametric side in a flat plate-like manner.

The brake caliper 16 includes friction pads (not illustrated) to be pressed against the flat plate portion 12bb of the brake rotor 12 at both sides. The brake caliper 16 is attached to a knuckle 8 which is a chassis frame component of the vehicle. The brake caliper 16 may be of a hydraulic or mechanical type. Alternatively, the brake caliper may be of an electric motor-driven type.

Electric Motor 3

As shown in FIG. 1, the electric motor 3 is a motor generator for travel assisting which can generate electric power by rotation of the wheel 10 and can be fed from an external source to rotationally drive the wheel 10. The electric motor 3 is of an outer rotor type which includes a stator 18 and a rotor 19, the rotor 19 being located radially outside of the stator 18. The rotor 19 is of a direct drive type, which is attached to the hub flange 7 through a rotor casing 15 as a cover member. The rotor casing 15 covers the electric motor 3 and a part of the wheel bearing 2, the part being located on the inboard side with respect to the hub flange 7, such that a separated space Is is defined inside the rotor casing.

The entire electric motor 3 including the stator 18 and the rotor 19 has a smaller diameter than that of the outer peripheral part 12b of the brake rotor 12. Further, the entirety of the stator 18 and the rotor 19 is located within an axial range L1 between the hub flange 7 and an outboard-side surface 8a of the knuckle 8. The electric motor 3 may be an IPM (interior permanent magnet) synchronous motor (or also abbreviated as an IPMSM (interior permanent magnet synchronous motor)) or an SPM (surface permanent magnet) synchronous motor of an outer rotor type. Besides, the motor generator 3 may be of any type, such as a switched reluctance motor (abbreviated as SR motor) and an induction motor (abbreviated as IM). In any of the motor types, the stator 18 may have any winding form, such as a distributed coil or a concentrated coil.

The rotor casing 15 has a bottomed cylindrical shape and includes the casing bottom part 11 having an annular, flat plate-like shape and a casing cylindrical part 25 extending from an outer peripheral edge portion of the casing bottom part 11 toward the inboard side in a cylindrical manner. The casing bottom part 11 and the casing cylindrical part 25 may be formed integrally with or separate from each other. The casing bottom part 11 is interposed between the flat plate part 12a of the brake rotor 12 and the hub flange 7.

The casing cylindrical part 25 includes a cylindrical portion main body 25a and a rotor casing end ring member 26 connected to an inboard-side end of the cylindrical portion main body 25a. The cylindrical portion main body 25a has an inner peripheral surface having a small-diameter section, a medium-diameter section, and a large-diameter section in sequence from the outboard side to the inboard side. The rotor 19 includes a magnetic body 19a disposed in the medium-diameter section of the cylindrical portion main body 25a by e.g. fitting and a plurality of permanent magnets (not illustrated) incorporated in the magnetic body 19a. An outboard-side end of the rotor 19 is abutted to a stepped part connecting the small-diameter section and the medium-diameter section of the cylindrical portion main body 25a, so that the rotor 19 is axially positioned with respect to the rotor casing 15.

The rotor casing end ring member 26 having an annular shape is fixed to the large-diameter section of the cylindrical portion main body 25*a* and an end face thereof by a non-illustrated bolt or the like. A predetermined axial gap is defined between the rotor casing end ring member 26 and the outboard-side surface 8*a* of the knuckle 8. The rotor casing end ring member 26 is formed with an annular groove recessed radially inward on an outer peripheral surface of the rotor casing end ring member, which faces the large-diameter section of the cylindrical portion main body 25*a*. A seal component 28 is disposed in the annular groove.

The seal component 28 may be e.g. an O-ring. The O-ring seals an interface between an inner peripheral surface of an end portion of the rotor casing 15 and the rotor casing end ring member 26. The rotor casing end ring member 26 also serves as a positioning member which axially positions the permanent magnets incorporated in the magnetic body 19*a*. Note that the cylindrical portion main body 25*a* and the rotor casing end ring member 26 may be integrally formed from a single material by machining or the like, instead of being constituted by multiple components jointed together.

As shown in FIG. 1 and FIG. 2, the stator 18 is attached to an outer peripheral surface of the outer ring 4 through a wheel bearing fixing member 24. The stator 18 includes a stator core 18*a* and winding coils 18*b* wound around the respective teeth of the stator core 18*a*. The winding coils 18*b* are connected to wires Wr. The wheel bearing fixing member 24 is in contact with an inner peripheral surface and an outboard-side end surface of the stator core 18*a* to retain the stator core 18*a*. The stator core 18*a* is fixed, for example, to the wheel bearing fixing member 24 with respect to a rotation direction and a radial direction by press-fitting or being bolted.

The wheel bearing fixing member 24 and the knuckle 8 are fastened to each other by bolts 20. A cover radial plate part 22*a* of a unit cover 22 is interposed between an inboard-side end face of the wheel bearing fixing member 24 and the outboard-side surface 8*a* of the knuckle 8. A non-illustrated communication hole is formed in the inboard-side end face of the wheel bearing fixing member 24, and the communication hole allows wires of the winding coils 18*b* to pass therethrough from an outer diametric side to an inner diametric side of the wheel bearing fixing member 24. The communication hole is only required to pass the wires Wr generally including three wires of U, V, and W phases therethrough. The knuckle 8 is formed with a through-hole 8*b* which allows an outer peripheral surface of the cylindrical part 22*b* of the cover 22 to be inserted therethrough, and a plurality of insertion holes for the bolts 20 are formed around the through-hole 8*b*.

The wheel bearing fixing member 24 is formed with a plurality of female threads extending in the axial direction at equal intervals in a circumferential direction. The cover radial plate part 22*a* is formed with through-holes in phase with the respective female threads. The respective bolts 20 are inserted into the insertion holes of the knuckle 8 from the inboard side of the knuckle 8 and then into the through-holes of the cover radial plate part 22*a* and are screwed into the respective female threads of the wheel bearing fixing member 24. Note that the wheel bearing fixing member 24 may be integrally formed with the outer ring 4.

Sealing Structure

Figure 3:
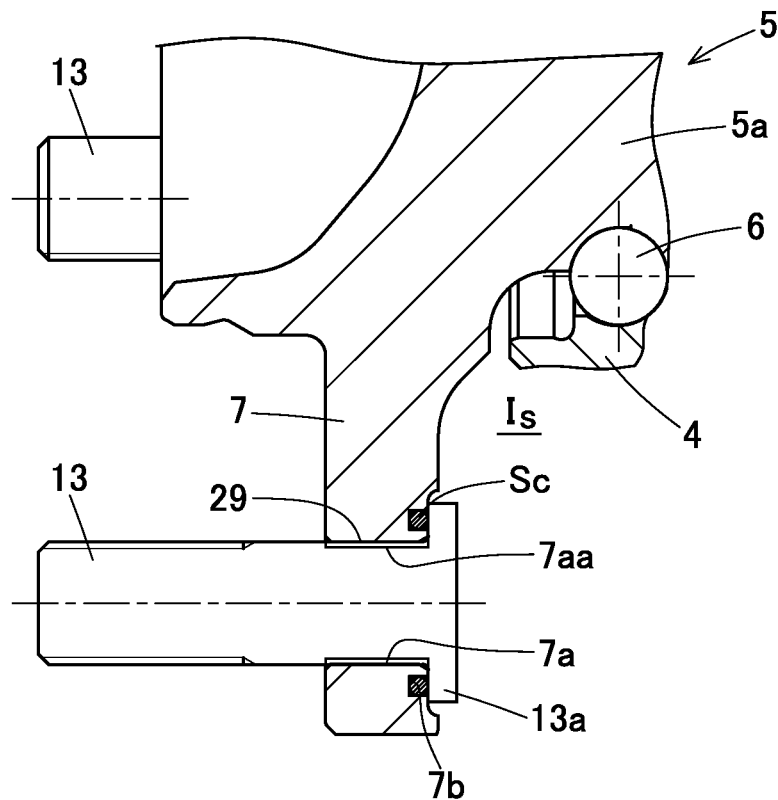
FIG. 3 is an enlarged sectional view of a main part of the vehicle power device.

As shown in FIG. 1, the vehicle power device 1 includes an inboard-side sealing member Sa, an outboard-side sealing member Sb, and a seal member Sc as also shown in FIG. 3.

Inboard-Side Sealing Member Sa

The inboard-side sealing member Sa seals a gap between an inboard-side end of the casing cylindrical part 25 and the outboard-side surface 8*a* of the knuckle 8. The inboard-side sealing member Sa includes a seal component 27.

The rotor casing end ring member 26 is formed with an annular groove recessed radially outward on an inboard-side part of the inner peripheral surface of the rotor casing end ring member, and the seal component 27 is disposed between the annular groove and the outer peripheral surface of the cover radial plate part 22*a*. The seal component 27 includes, for example, an annular seal plate and an elastic seal member which face each other between the annular groove and the outer peripheral surface of the cover radial plate part 22*a*.

Outboard-Side Sealing Member Sb

The outboard-side sealing member Sb seals a gap between the casing bottom part 11 of the rotor casing 15 and the outboard-side end of the hub flange 7. The casing bottom part 11 is formed with an annular groove recessed axially on an inner diametric side part of an inboard-side surface of the casing bottom part. The outboard-side sealing member Sb may be e.g. an O-ring and is disposed in the annular groove. The O-ring seals an interface between the inboard-side surface of the casing bottom part 11 and the outboard-side surface of the hub flange 7.

Seal Member Sc

The seal member Sc prevents entry of moisture from press-fitting parts of the hub bolts 13. The hub flange 7 is formed with a plurality of bolt holes 7*a* at equal intervals in the circumferential direction, and the hub bolts 13 are press-fitted into the respective bolt holes 7*a* from the inboard side. Each hub bolt 13 is provided with a serration 29 for preventing rotation of the hub bolt 13 at a base-end portion of an outer peripheral surface of the hub bolt, the base-end portion being a part where the hub bolt is press-fitted into a bolt hole 7*a*. Each bolt hole 7*a* of the hub flange 7 is provided with a to-be-meshed part 7*aa* with which the serration 29 is meshed.

The hub flange 7 is formed with annular grooves 7*b* coaxial with the respective hub bolts 13, each of the annular grooves being formed in an area where a head 13*a* of a hub bolt 13 comes into contact with an inboard-side surface of the hub flange (for example, an area around each press-fitting part). The seal member Sc having a ring shape is disposed in each of the annular grooves 7*b*. The seal member Sc may be e.g. an O-ring made of a rubber material. Thus, when a nut 23 is screwed onto a male thread portion of each hub bolt 13, the seal member Sc is pressed by the head 13*a* of the hub bolt 13 to be elastically deformed in the annular groove 7*b*, so that an interface between the inboard-side surface of the hub flange 7 and the head 13*a* of the hub bolt 13 is sealed. Note that the seal member Sc may also be made of a resin material or a metal material. Besides, the seal member Sc may be a liquid gasket filled into each of the annular grooves 7*b*.

Rotation Detector

The vehicle power device 1 is provided with a rotation detector 31.

The rotation detector 31 is located in a hollow internal space of the stator 18. The rotation detector 31 detects a rotation angle or a rotation speed of the inner ring 5 with respect to the outer ring 4 in order to control the rotation of the electric motor 3 for drive assistance. The rotation detector 31 includes a to-be-detected part 31*a* attached to a to-be-detected part holding member 32 or the like and a sensor part 31*b* attached to an inner peripheral surface of the wheel bearing fixing member 24 and adapted to detect the to-be-detected part 31*a*. The rotation detector 31 may be, for example, a resolver. It should be noted that the rotation detector 31 is not limited to a resolver and may be any of, for example, an encoder, a pulser ring, and a hall sensor, irrespective of the types.

As shown in FIG. 1 and FIG. 2, a connector cover 33 is attached to an inboard-side end of the cylindrical part 22*b* of the unit cover 22 such that the connector cover covers the inboard-side end. The connector cover 33 supports the wires Wr of the electric motor 3 through a power wire connector 34 of a so-called panel mount type. The connector cover 33 also supports a sensor connector Cn of a panel mount type.

Effects and Advantages

According to the vehicle power device 1 as described above, where the vehicle power device 1 including the electric motor 3 is mounted in a vehicle including a main drive source such as an internal combustion engine, the electric motor 3 enables drive assistance during driving and energy recovery by power generation during braking. Further, the rotor casing 15 as the cover member covers the electric motor 3 and a part of the wheel bearing 2, the part being located on the inboard side with respect to the hub flange 7, such that a separated space Is is defined inside the rotor casing. Furthermore, the seal member Sc configured to prevent entry of moisture from the press-fitting parts of the hub bolts 13 of the hub flange 7 is provided, so that it is possible to prevent entry of moisture into the separated space Is from the press-fitting parts of the hub bolts 13 even in the rain etc. This makes it possible to prevent the coil wires 18*b* of the stator 18 from being electrically short-circuited and to prevent the stator core 18*a* from rusting. Thus, the electric motor 3 can be kept normal.

Since the inboard-side sealing member Sa is provided for sealing a gap between the inboard-side end of the casing cylindrical part 25 and the knuckle 8, it is possible to easily prevent entry of moisture and foreign objects from the gap between the inboard-side end of the casing cylindrical part 25 and the knuckle 8. Also, since the outboard-side sealing member Sb is provided for sealing the gap between the casing bottom part 11 and the outboard-side end of the hub flange 7, it is possible to easily prevent entry of moisture and the like from the gap between the casing bottom part 11 and the outboard-side end of the hub flange 7.

Since the electric motor 3 has a smaller diameter than that of the outer peripheral part 12*b* of the brake rotor 12, and the electric motor 3 is located within the axial range L1 between the hub flange 7 and the outboard-side surface 8*a* of the knuckle 8, it is possible to secure a space for disposing the electric motor 3 inside the brake rotor 12, so that the electric motor 3 can be compactly accommodated.

Other Embodiments

Next, other embodiments will be described. In the following description, the same reference numerals are used to denote parts that correspond to those previously described in the respective embodiments, and overlapping description is omitted. Where only a part of a configuration is described, the rest of the configuration is to be construed as being the same as the previously described embodiments unless otherwise indicated. The same configurations provide the same effects. It is possible not only to combine the parts that have been particularly described in the respective embodiments but also to partly combine the embodiments unless there is any hindrance to such a combination.

Figure 4:
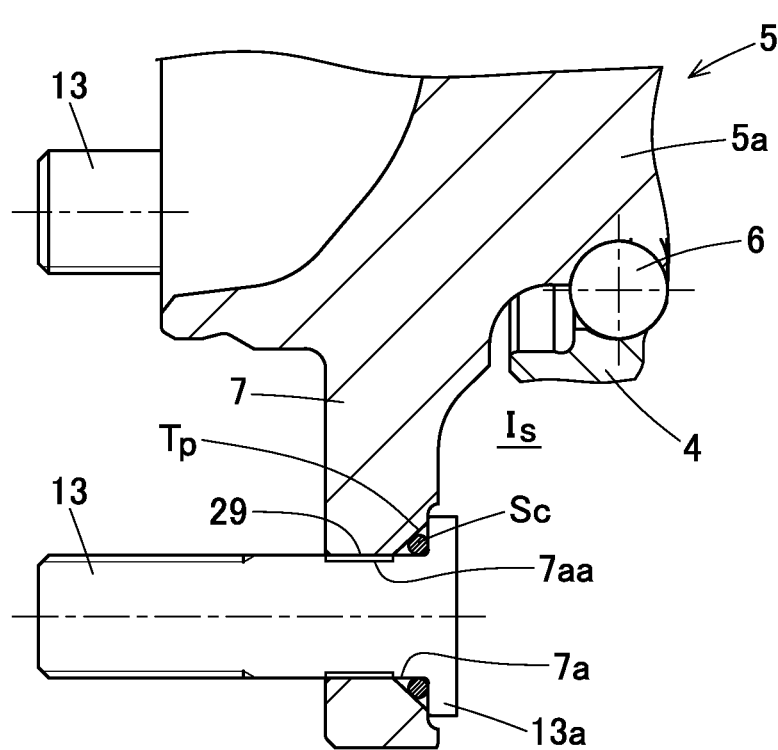
FIG. 4 is an enlarged sectional view of a main part of a vehicle power device according to another embodiment of the present invention.

As shown in FIG. 4, each bolt hole 7*a* may have an inboard-side part provided with a tapered part Tp having an increasing diameter toward the inboard side, and the seal member Sc may be incorporated between the head 13*a* of hub bolt 13 and the tapered part Tp. Note that each hub bolt 13 does not have a serration on a part of its outer peripheral surface which faces the tapered part Tp, and each hub bolt 13 has the serration 29 only on a part of its outer peripheral surface which corresponds to a portion of the press-fitting part where the tapered part Tp is not provided in the bolt hole 7*a*. In such a case, it is possible to use common hub bolts 13 to prevent entry of moisture into the separated space Is from the press-fitting parts of hub bolts 13 and to eliminate an operation of newly processing a groove for sealing in the hub flange 7, so that the number of manufacturing steps can be reduced.

Figure 5:
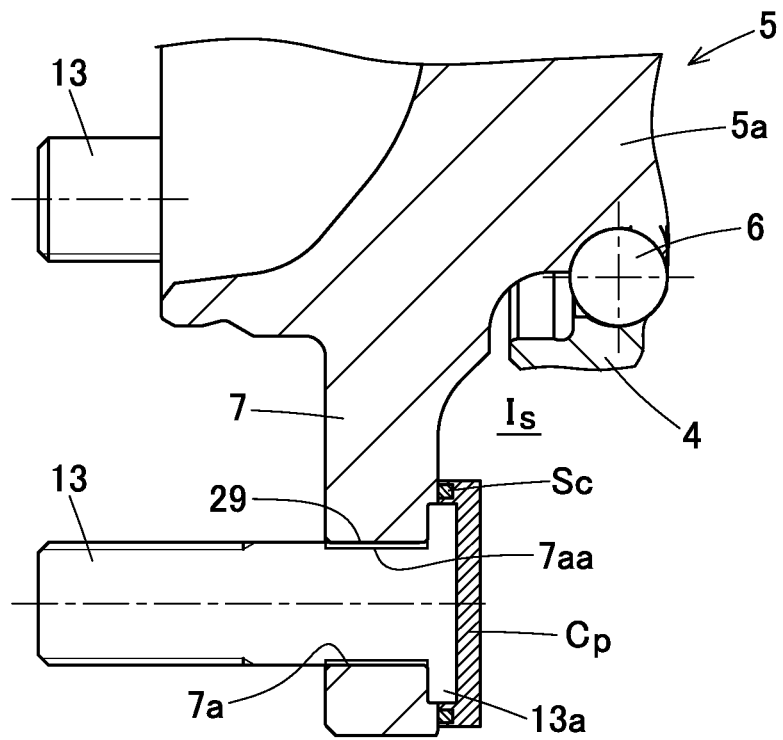
FIG. 5 is an enlarged sectional view of a main part of a vehicle power device according to yet another embodiment of the present invention.

As shown in FIG. 5, a seal cap Cp having a bottomed cylindrical shape and covering a surface of the head 13*a* of each hub bolt 13 may be attached to the head 13*a* of each hub bolt 13 by press-fitting or the like, and the seal member Sc may be incorporated to an opening edge portion (for example, an area around each press-fitting part) of the seal cap Cp. According to this constitution, it is possible to prevent entry of moisture into the separated space Is from the press-fitting parts of the hub bolts 13, without any special processing to the hub flange 7.

Figure 6:
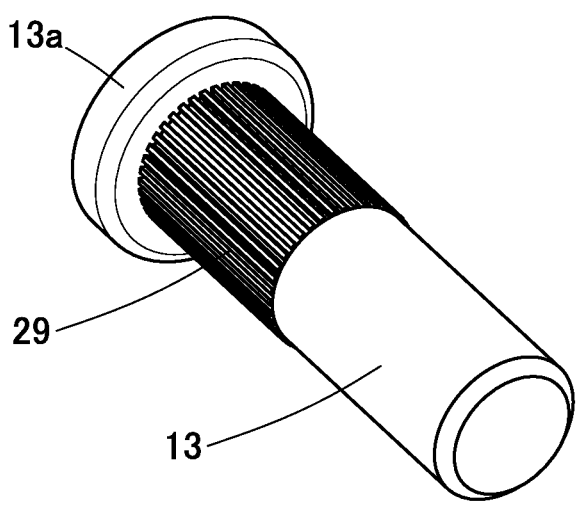
FIG. 6 illustrates a typical hub bolt.

As shown in FIG. 6, a common hub bolt 13 is formed with the serration 29 on a base-end portion of its outer peripheral surface, the serration serving to prevent rotation of a hub bolt 13 with respect to the hub flange 7 (FIG. 1). The base-end portion of the hub bolt 13, where the serration 29 is formed, is press-fitted into a bolt hole 7*a* (FIG. 3) of the hub flange 7 (FIG. 1).

Figure 7A:
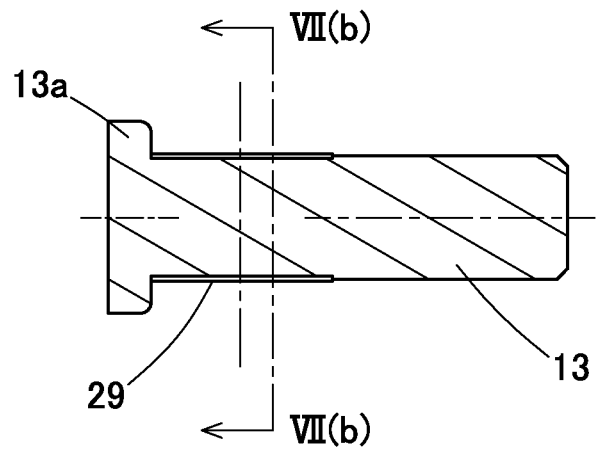
FIG. 7A is a longitudinal sectional view of a hub bolt of a vehicle power device according to still another embodiment of the present invention.
Figure 7B:
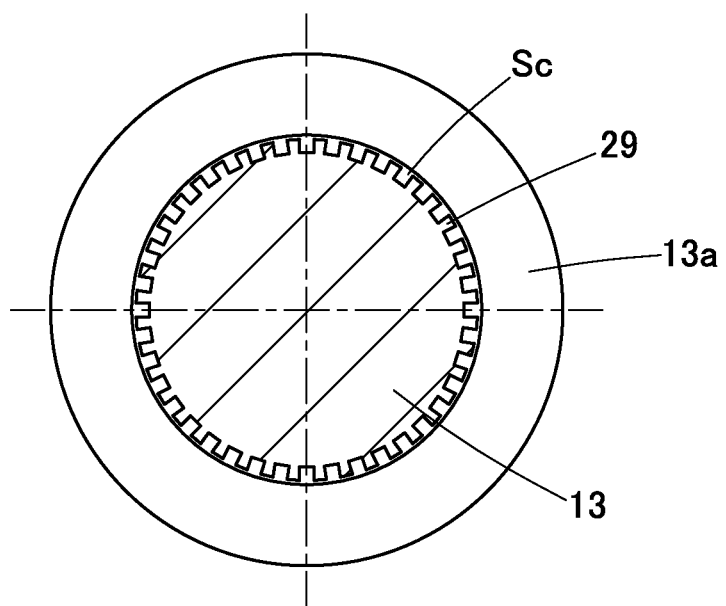
FIG. 7B is an enlarged cross-sectional view of FIG. 7A.
Figure 8:
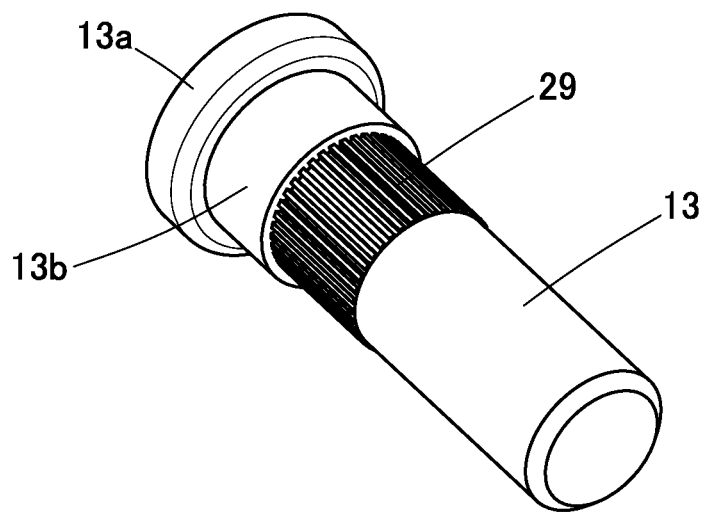
FIG. 8 is a perspective view of a hub bolt of a vehicle power device according to yet another embodiment of the present invention.

FIG. 7A is a longitudinal sectional view of a hub bolt according to another embodiment, and FIG. 7B is an enlarged cross-sectional view along line VII(b)-VII(b) of FIG. 7A. As shown in FIG. 7A, FIG. 7B and FIG. 8, a liquid gasket as the seal member Sc may be filled into longitudinal groove portions and an outer diametric portion of the serration 29 to seal these portions. In such a case, the liquid gasket Sc is applied and allowed to solidify, so that sealing performance can be enhanced. Where the liquid gasket is filled into the serration 29, it is possible to reduce the number of processing steps and simplify the work as compared to a case where an O-ring or the like is incorporated to each annular groove.

Figure 9:
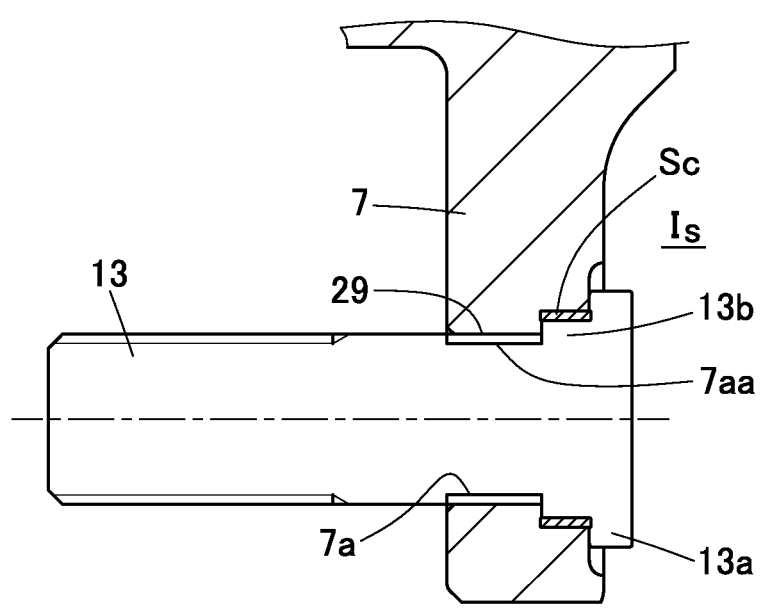
FIG. 9 is an enlarged sectional view showing the hub bolt etc.

In FIG. 8 and FIG. 9, the hub bolt 13 is provided with a large-diameter section 13*b* without the serration 29 at a base-end part on the outer peripheral surface of the hub bolt and adjacent to the serration 29. The large-diameter section 13*b* has a larger diameter than that of an outer diametric part of the serration 29. Each bolt hole 7*a* of the hub flange 7 has an inboard-side part formed with a large-diameter hole to which the large-diameter section 13*b* of a hub bolt 13 is inserted. The seal member Sc is inserted into an annular gap between the large-diameter hole of the hub flange 7 and the large-diameter section 13*b* of the hub bolt 13 to seal the gap.

Vehicular System

Figure 10:
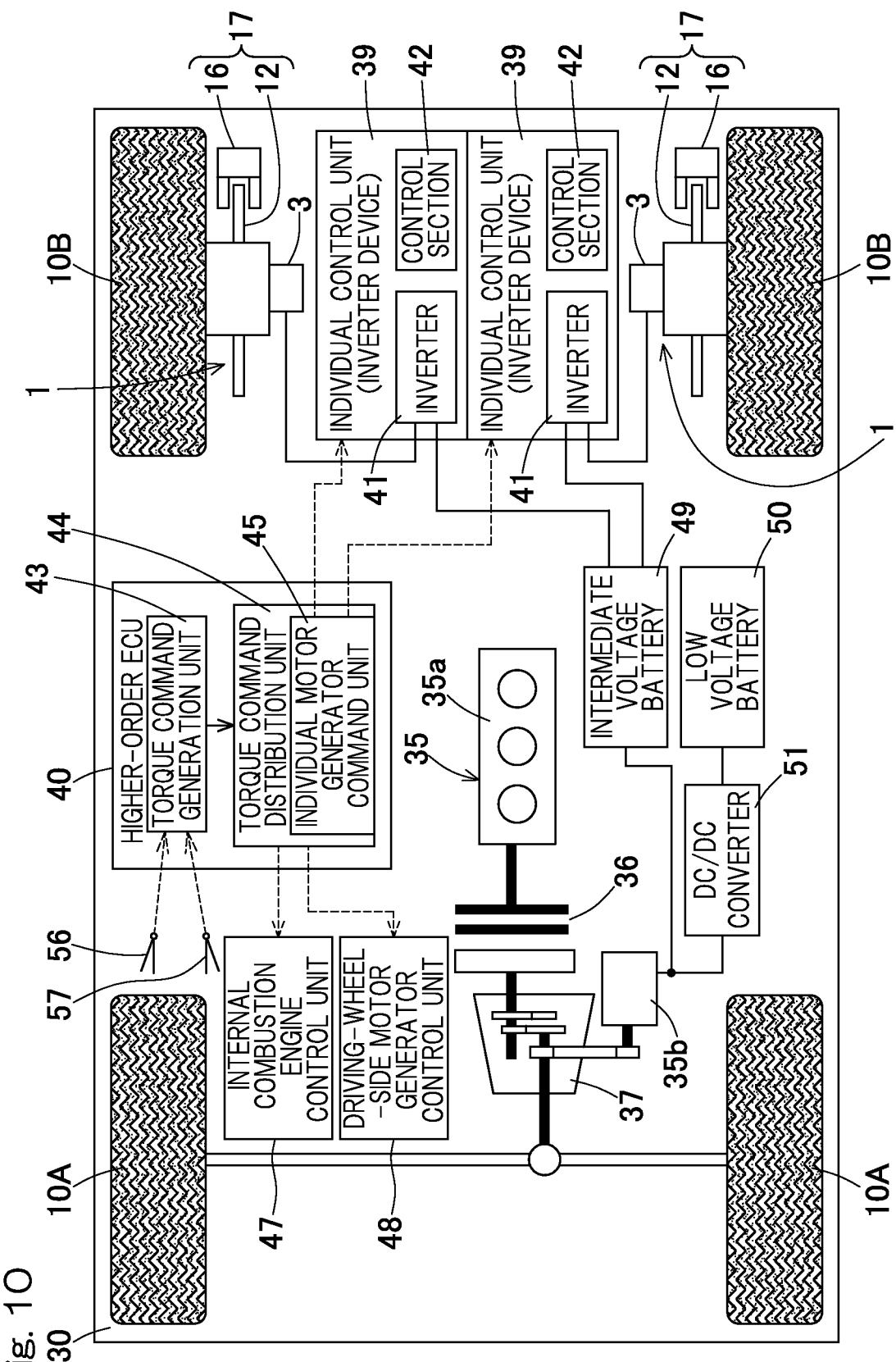
FIG. 10 is a block diagram illustrating conceptual features of a vehicular system for a vehicle including any of the vehicle power devices.

FIG. 10 is a block diagram illustrating conceptual features of a vehicular system including any of the above vehicle power devices 1. In this vehicle system, the vehicle power device 1 is installed in a driven wheel $10_B$ of a vehicle 30 including the driven wheel $10_B$ mechanically unconnected to a main drive source. The wheel bearing 2 (FIG. 1) of the vehicle power device 1 is a bearing for supporting the driven wheel $10_B$.

The main drive source 35 may be an internal combustion engine such as a gasoline engine or a diesel engine, or a motor generator (electric motor), or a hybrid type drive source in which an internal combustion engine and a motor generator are combined. The term "motor generator" refers to an electric motor capable of generating electric power when rotation is applied. In the illustrated example, the vehicle 30 is a front-wheel drive vehicle including driving wheels 10$_A$ as front wheels and driven wheels 10$_B$ as rear wheels, and is a hybrid vehicle (hereinafter, sometimes referred to as "HEV") with main drive sources 35 including an internal combustion engine 35*a* and a driving-wheel-side motor generator 35*b*.

Specifically, the vehicle is of a mild hybrid type in which the driving-wheel-side motor generator 35*b* is driven at an intermediate voltage of, e.g., 48V. Hybrid vehicles are generally categorized into strong hybrids and mild hybrids: the mild hybrids refer to hybrid vehicles that have an internal combustion engine as a main drive source and use a motor mainly to assist travelling when they start moving and/or accelerate, and they are distinguished from the strong hybrids in that the mild hybrids can normally travel in an EV (electric vehicle) mode only for a while, but not for a long time. The internal combustion engine 35*a* in the illustrated example is connected to a drive shaft of the driving wheels 10$_A$ via a clutch 36 and a speed reduction gear 37, and the driving-wheel-side motor generator 35*b* is connected to the speed reduction gear 37.

The vehicle system includes: electric motors 3 that are motor generators for travel assisting that rotationally drive the driven wheels 10$_B$; individual control units 39 that control the electric motors 3; and an individual motor generator command unit 45 that is provided in a higher order ECU 40 and outputs a command for causing the individual control units 39 to control driving and power regeneration. The electric motors 3 are connected to a power storage unit. The power storage unit may be, e.g., a battery (rechargeable battery) or a capacitor. Although the power storage unit may be of any type and be positioned anywhere in the vehicle 30, in this embodiment, it corresponds to an intermediate voltage battery 49, among a low voltage battery 50 and the intermediate voltage battery 49 installed in the vehicle 30.

The electric motors 3 for the driven wheels are direct drive motors in which no speed reduction gear is used. The electric motors 3 operate as electric motors when supplied with power and also serve as generators for converting kinetic energy of the vehicle 30 into electric power. Since each electric motor 3 has the rotor 19 (FIG. 1) attached to the hub axle 5*a* (FIG. 1), the inner ring 5 (FIG. 1) is rotationally driven when electric current is applied to the electric motor 3, whereas regenerative power is generated when an induction voltage is applied during power regeneration.

Control System of Vehicle 30

The higher order ECU 40 is a unit for performing integrated control of the vehicle 30 and includes a torque command generation unit 43. The torque command generation unit 43 generates a torque command in accordance with a signal of an operation amount inputted from each of an accelerator operation unit 56 (such as an accelerator pedal) and a brake operation unit 57 (such as a brake pedal). The vehicle 30 includes an internal combustion engine 35*a* and a driving-wheel-side motor generator 35*b* as main drive sources 35 as well as two electric motors 3, 3 for driving the two respective driven wheels 10$_B$, 10$_B$. Accordingly, the higher order ECU 40 is provided with a torque command distribution unit 44 for distributing the torque command(s) to the respective drive sources 35*a*, 35*b*, 3, 3 in accordance with a predetermined rule.

A torque command to the internal combustion engine 35*a* is transmitted to an internal combustion engine control unit 47 and is used, e.g., to control a valve opening degree by the internal combustion engine control unit 47. A torque command to the driving-wheel-side motor generator 35*b* is transmitted to and executed on a driving-wheel-side motor generator control unit 48. Torque commands to the electric motors 3, 3 on the driven wheel side are transmitted to the individual control units 39, 39. The individual motor generator command unit 45 refers to a section of the torque command distribution unit 44 which performs output to the individual control units 39, 39. The individual motor generator command unit 45 also has a function of providing each individual control unit 39 with a torque command that is a command of a distributed braking force to be produced by each electric motor 3 through regenerative braking in response to a signal of an operation amount from the brake operation unit 57.

Each of the individual control units 39 is an inverter device and includes: an inverter 41 for converting direct current from the intermediate voltage battery 49 into a three-phrase alternating current voltage; and a control section 42 for controlling an output of the inverter 41 in accordance with e.g. the torque command by e.g. PWM control. The inverter 41 includes: a bridge circuit (not illustrated) with e.g. a semi-conductor switching element; and a charge circuit (not illustrated) for charging the intermediate voltage battery 49 with regenerative power from the electric motor 3. It should be noted that although each of the individual control units 39 is separately provided to each of the two electric motors 3, 3, the two individual control units 39, 39 may be disposed in a single enclosure and share a control section 42 in common.

Figure 11:
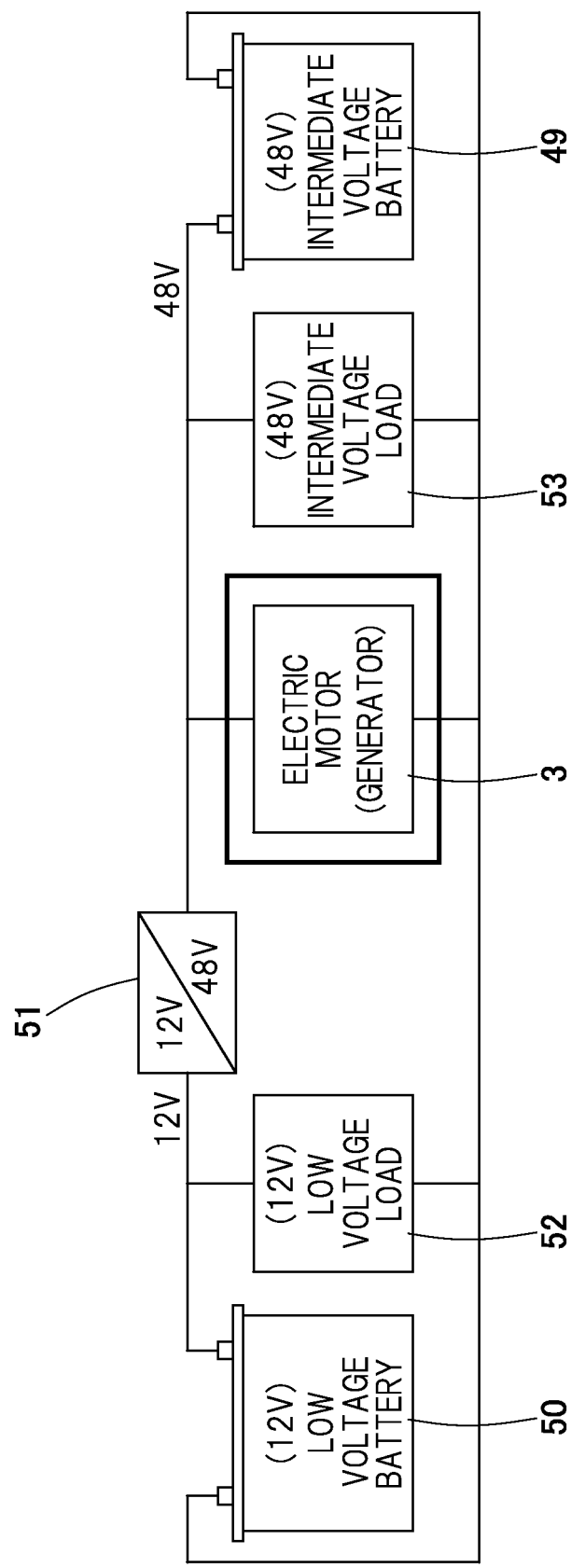
FIG. 11 is a power system diagram of an exemplary vehicle including the vehicular system.

FIG. 11 is a power system diagram of an exemplary vehicle equipped with the vehicle system as shown in FIG. 10. In the example of FIG. 11, there are a low voltage battery 50 and an intermediate voltage battery 49 as batteries, and the batteries 49, 50 are connected through a DC/DC convertor 51. There are two electric motors 3, but only one of them is illustrated as a representative. Although the driving-wheel-side motor generator 35*b* in FIG. 10 is not illustrated in FIG. 11, it is connected to an intermediate voltage system in parallel with the electric motor 3 on the driven wheel side. A low voltage load 52 is connected to a low voltage system, and an intermediate voltage load 53 is connected to the intermediate voltage system. There are a plurality of the low voltage loads 52 and a plurality of the intermediate voltage loads 53, but only one for each load is illustrated as a representative.

The low voltage battery 50 is a battery that is commonly used as a power source for e.g. a control system in various automobiles, and may be of, for example, 12 V or 24 V. The low voltage load 52 may include a starter motor of the internal combustion engine 35*a*, lights, and key components, such as the higher order ECU 40 and other ECU (not illustrated). The low voltage battery 50 may be called as an auxiliary battery for electric accessories, and the intermediate voltage battery 49 may be called as an auxiliary battery for an electric system.

The intermediate voltage battery 49 has a voltage higher than that of the low voltage battery 50 but lower than that of a high voltage battery (100 V or higher, for example, about 200 to 400 V) used for e.g. strong hybrid vehicles, the voltage having a negligible influence to a human body when an electric shock occurs during operation. The intermediate voltage battery may preferably be a 48-V battery that are used in mild hybrids in recent years. The intermediate voltage battery 49, such as a 48-V battery, can be relatively easily installed in a vehicle equipped with a conventional internal combustion engine, and such a vehicle can be employed for a mild hybrid so as to reduce fuel consumption by power assistance and/or regeneration by electric power.

The intermediate voltage loads 53 in the 48-V system are the accessory components, including the power-assist motor that is the driving-wheel-side motor generator 3, an electric pump, an electric power steering, a supercharger, and an air compressor. Since the loads from the accessories are set up as the 48-V system, the system can reduce the possibility of an electric shock to a passenger or a maintenance operator, although the system can provide a reduced output for power assistance as compared with that of a high voltage system (such as a strong hybrid vehicle with a voltage of 100 V or higher). The system also allows an insulation coating for wiring to be thin, so that the weight and/or volume of the wiring can be reduced. In addition, the system can input/output a larger electric power with a smaller amount of current than a 12-V system, so that the volume of the electric motor or the generator can be reduced. Thus, the system contributes to the effect of reducing fuel consumption of the vehicle.

This vehicle system is suitable for accessory components of such a mild hybrid vehicle and is applied as a power-assisting and power-regenerative component. It should be noted that although conventionally, a mild-hybrid vehicle sometimes includes a CMG (crankshaft motor-driven generator), a GMG (gearbox motor-driven generator), or a belt-drive starter motor (none of them are illustrated), all of these are affected by efficiency of a transmission device and a speed reduction gear because they perform power assistance or power regeneration for an internal combustion engine or a power device.

In contrast, since the vehicle system of this embodiment is mounted in the driven wheel $10_B$, the vehicle system is unconnected to the main drive sources such as the internal combustion engine 35a and the electric motor (not illustrated) and can directly use kinetic energy of the vehicle body in power regeneration. In cases where a CMG, or a GMG, or a belt-drive starter motor is provided, its incorporation has to be taken into consideration from a designing phase of the vehicle 30, and thus it is difficult to retrofit these components. In contrast, the electric motor 3 of this vehicle system, which can be accommodated inside the driven wheel $10_B$, can be attached even to a finished vehicle in a number of steps equivalent to that for replacing a component, making it possible to set up a 48-V system even to the finished vehicle including only an internal combustion engine 35a. A vehicle including the vehicular system according to the present embodiment may also include another supplementary drive motor generator 35b as in the example of FIG. 10. In that case, it is possible to increase drive assistance amount and power regeneration amount in the vehicle 30, so that fuel consumption can further be reduced.

Figure 12:
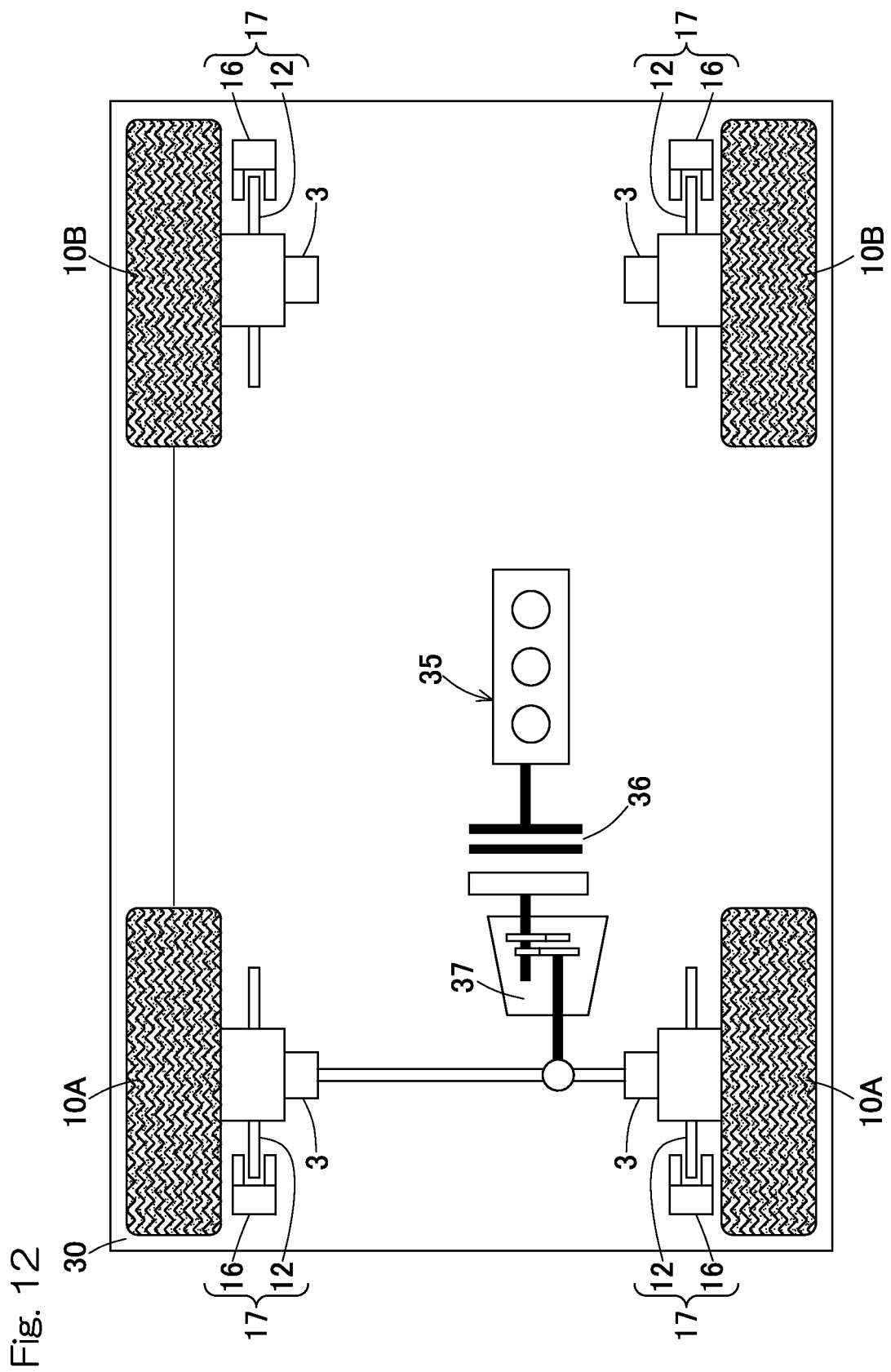
FIG. 12 illustrates concepts of another vehicular system including the vehicle power device.
Figure 13:
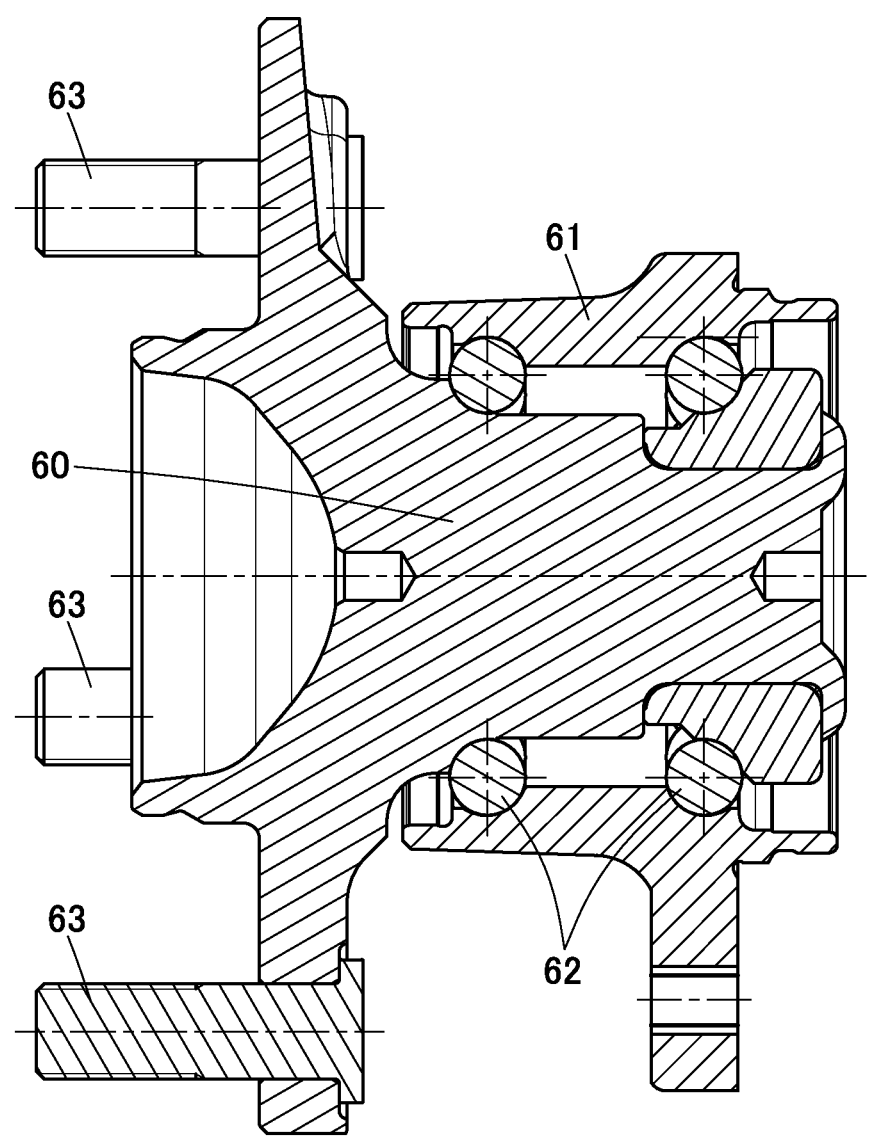
FIG. 13 is a sectional view of a conventional wheel bearing.
Figure 14:
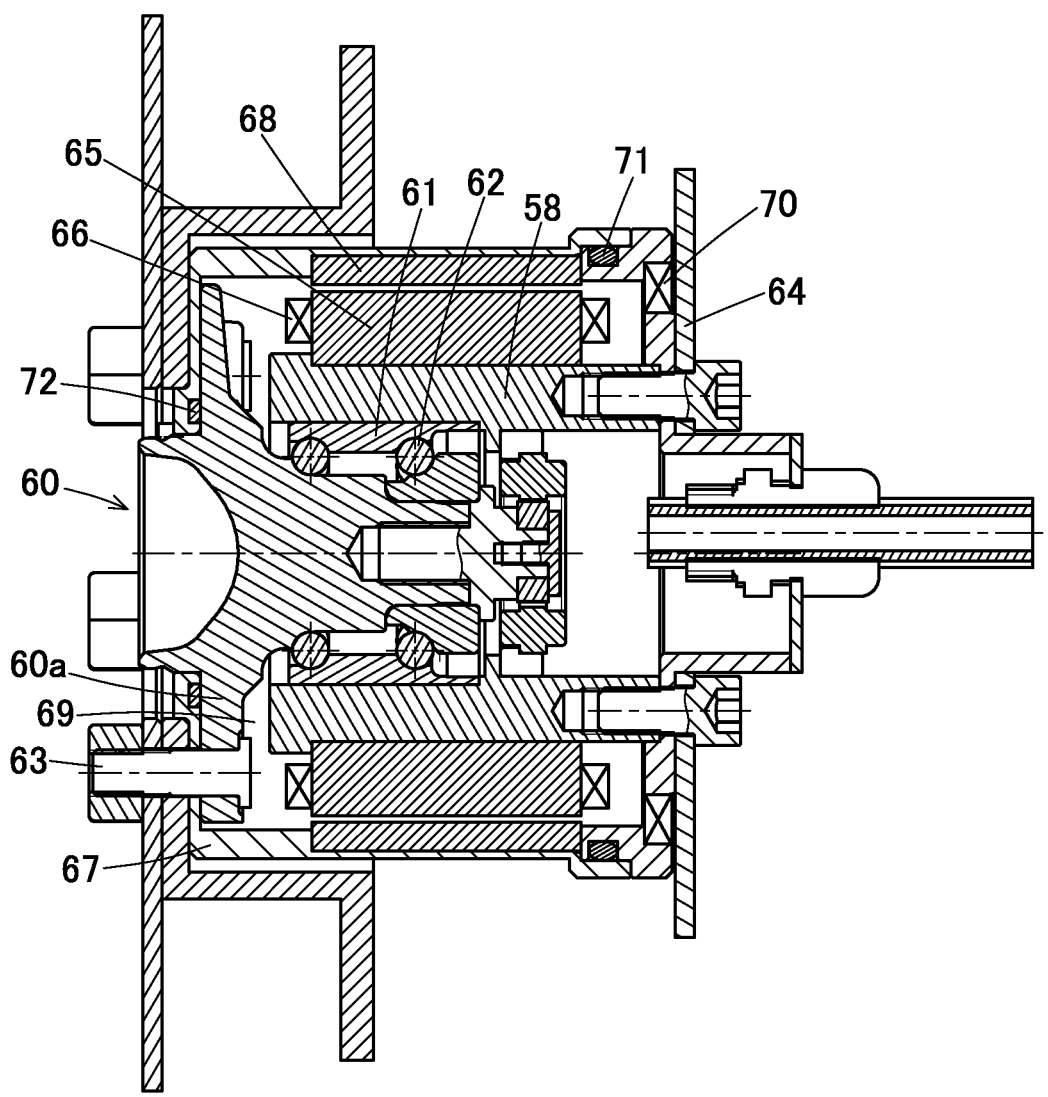
FIG. 14 is a sectional view of a vehicle power device including a conventional wheel bearing.

FIG. 12 shows an example in which vehicle power devices 1 according to any of the embodiments are applied to driving wheels $10_A$ as front wheels and driven wheels $10_B$ as rear wheels. The driving wheels $10_A$ are driven by a main drive source 35 including an internal combustion engine through a clutch 36 and a speed reduction gear 37. This front-wheel drive vehicle includes the vehicle power devices 1 for supporting and supplementarily driving the respective driving wheels $10_A$ and driven wheels $10_B$. In such a way, the vehicle power devices 1 may be applied not only to the driven wheels $10_B$ but also to the driving wheels $10_A$.

The vehicle system as shown in FIG. 10 may be a system that has a function of generating electric power but does not perform rotational drive when supplied with power. This vehicle system includes a generator-equipped wheel bearing device including a generator 3 that does not serve as a motor and a wheel bearing 2. The generator-equipped wheel bearing device has the same configuration as that of the vehicle power device according to any of the embodiments, except for the electric motor.

In such a case, regenerative power generated by the generator 3 can be stored in the intermediate voltage battery 49 so that a braking force can be generated. Appropriate use of such a system in combination with or alternative to the mechanical brake operation unit 57 makes it possible to improve braking performance. Thus, when limited to the function of generating electric power, each individual control unit 39 may be in the form of an AC/DC converter device (not illustrated), instead of an inverter device. The AC/DC converter device has a function of converting three-phase alternating current voltage to direct current voltage so as to charge the intermediate voltage battery 49 with the regenerative power from the generator 3 and can be controlled more easily than an inverter, so that the AC/DC converter device can have a more compact configuration.

The vehicle power device 1 of the present invention has a third generation structure which includes the hub axle fitted with the single partial inner ring as a rotary ring and is constituted by the outer ring as a fixed ring and an assembly of the hub axle and the partial inner ring. However, the configuration of the vehicle power device is not limited to this structure.

A structure body combinedly including a hub having a hub flange and a member having raceway surfaces for rolling elements corresponds to a rotary ring in the claims. For example, the vehicle power device may have a first generation structure including an outer ring mainly serving as a fixed ring and an inner ring fitted to an outer peripheral surface of a hub having a hub flange, or a second generation structure of an inner ring rotation type including an outer ring as a fixed ring and an inner ring fitted to an outer peripheral surface of a hub having a hub flange. In these examples, a combined body of the hub and the inner ring corresponds to a "rotary ring" in the claims. The vehicle power device may have a second generation structure of an outer ring rotation type including an outer ring as a rotary ring having a hub flange and an inner ring as a fixed ring.

The vehicle power device may be constructed such that the casing bottom part 11 is fixed to the inboard-side surface of the hub flange 7, and the outboard-side sealing member Sb seals a gap between the casing bottom part 11 and the inboard-side surface of the hub flange 7. The vehicle power device may also be constructed such that rotor casing 15 as the cover member is fixed to the outer peripheral surface of the hub flange 7, and the casing bottom part is omitted.

Although the present invention has been described in terms of the preferred embodiments thereof with reference to the drawings, various additions, modifications, or deletions may be made without departing from the scope of the invention. Accordingly, such variants are included within the scope of the present invention.

REFERENCE NUMERALS

1 . . . vehicle power device
2 . . . wheel bearing
3 . . . electric motor (generator)
4 . . . outer ring (fixed ring)
5 . . . inner ring (rotary ring)
6 . . . rolling element 7 ... hub flange
8 ... knuckle (chassis frame component)
11 ... casing bottom part
12 ... brake rotor
12b ... outer peripheral part
13 ... hub bolt
13a ... head
15 ... rotor casing (cover member)
16 ... brake caliper
18 ... stator
19 ... rotor
25 ... casing cylindrical part
Cp ... seal cap
Sa ... inboard-side sealing member
Sb ... outboard-side sealing member
Sc ... seal member
Tp ... tapered part

What is claimed is:

1. A vehicle power device comprising:
a wheel bearing including a fixed ring and a rotary ring rotatably supported by the fixed ring through rolling elements, the rotary ring including a hub flange configured to be attached with a wheel of a vehicle; and
an electric motor including a stator attached to the fixed ring and a rotor attached to the rotary ring, and
the vehicle power device further comprising:
a cover member covering the electric motor and a part of the wheel bearing, the part being located on an inboard side with respect to the hub flange, such that a separated space is defined inside the cover member; and
a seal member configured to prevent entry of moisture from a press-fitting part where a hub bolt is press-fitted into a bolt hole provided in the hub flange, the seal member being disposed at the press-fitting part or near the press-fitting part.

2. The vehicle power device as claimed in claim 1, wherein the wheel bearing has an outer ring serving as the fixed ring and an inner ring serving as the rotary ring, the cover member is fixed to the hub flange of the inner ring, the cover member has a casing cylindrical part having a cylindrical shape and covering the electric motor and the part located on the inboard side with respect to the hub flange, and the stator is disposed on an outer periphery of the outer ring.

3. The vehicle power device as claimed in claim 2, wherein the cover member includes: a casing bottom part having a flat annular plate shape and fixed to a side surface of the hub flange; and the casing cylindrical part extending from an outer peripheral edge portion of the casing bottom part toward the inboard side, and further,
the vehicle power device is provided with an inboard-side sealing member configured to seal a gap between an inboard-side end of the casing cylindrical part and a chassis frame component of the vehicle and with an outboard-side sealing member configured to seal a gap between the casing bottom part and the side surface of the hub flange.

4. The vehicle power device as claimed in claim 2, wherein a brake rotor is attached to the hub flange along with the wheel, the electric motor has a smaller diameter than that of an outer peripheral part of the brake rotor against which a brake caliper is pressed, and the electric motor is located within an axial range between the hub flange and an outboard-side surface of a chassis frame component of the vehicle.

5. The vehicle power device as claimed in claim 1, wherein the seal member is incorporated between a head of the hub bolt and an inboard-side end of the hub flange.

6. The vehicle power device as claimed in claim 1, wherein the bolt hole has an inboard-side part provided with a tapered part having an increasing diameter toward the inboard side, and the seal member is incorporated between a head of the hub bolt and the tapered part.

7. The vehicle power device as claimed in claim 1, wherein a seal cap having a bottomed cylindrical shape and covering a surface of a head of the hub bolt is attached to the head of the hub bolt, and the seal member is incorporated to an opening edge portion of the seal cap.

8. The vehicle power device as claimed in claim 1, wherein the seal member is shaped as a ring made of a rubber material, a resin material, or a metal material.

9. The vehicle power device as claimed in claim 1, wherein the seal member is a liquid gasket.

10. A generator-equipped wheel bearing device comprising:
a wheel bearing including a fixed ring and a rotary ring rotatably supported by the fixed ring through rolling elements, the rotary ring including a hub flange configured to be attached with a wheel of a vehicle; and
a generator including a stator attached to the fixed ring and a rotor attached to the rotary ring, and
the generator-equipped wheel bearing device further comprising:
a cover member covering the generator and a part of the wheel bearing, the part being located on an inboard side with respect to the hub flange, such that a separated space is defined inside the cover member; and
a seal member configured to prevent entry of moisture from a press-fitting part where a hub bolt is press-fitted into a bolt hole provided in the hub flange, the seal member being disposed at the press-fitting part or near the press-fitting part.

* * * * *